United States Patent
Muratov (10) Patent No.: US 11,289,953 B2
(45) Date of Patent: Mar. 29, 2022

(54) ADAPTING WIRELESS POWER TRANSFER PARAMETERS TO TRANSMITTER OPERATING CONDITIONS

(71) Applicant: MEDIATEK Singapore Pte. Ltd., Singapore (SG)

(72) Inventor: Vladimir A. Muratov, Manchester, NH (US)

(73) Assignee: MEDIATEK Singapore Pte. Ltd., Singapore (SG)

(*) Notice: Subject to any disclaimer, the term of this patent is extended or adjusted under 35 U.S.C. 154(b) by 793 days.

(21) Appl. No.: 15/993,319

(22) Filed: May 30, 2018

(65) Prior Publication Data

US 2019/0013702 A1    Jan. 10, 2019

Related U.S. Application Data (60) Provisional application No. 62/528,619, filed on Jul. 5, 2017.

(51) Int. Cl.
| | |
|---|---|
| *H02J 50/80* | (2016.01) |
| *H02J 7/02* | (2016.01) |
| *H02J 50/10* | (2016.01) |
| *H02J 50/12* | (2016.01) |

(52) U.S. Cl.
CPC .............. *H02J 50/80* (2016.02); *H02J 7/025* (2013.01); *H02J 50/10* (2016.02); *H02J 50/12* (2016.02)

(58) Field of Classification Search
CPC ............. H02J 50/80; H02J 50/10; H02J 7/025
USPC ........................................................ 307/104
See application file for complete search history.

(56) References Cited

U.S. PATENT DOCUMENTS

| | | | |
|---|---|---|---|
| 6,072,990 A | 6/2000 | Agrawal et al. | |
| 2009/0278505 A1 | 11/2009 | Toya et al. | |
| 2012/0256494 A1 | 10/2012 | Kesler et al. | |
| 2013/0181539 A1 | 7/2013 | Muratov et al. | |
| 2014/0159654 A1* | 6/2014 | Lee .................... | H02J 50/40 |
| | | | 320/108 |
| 2014/0327393 A1 | 11/2014 | Lee et al. | |
| 2014/0361738 A1* | 12/2014 | Lee .................... | H02J 50/80 |
| | | | 320/108 |
| 2015/0352963 A1 | 12/2015 | Grabar et al. | |
| 2016/0181856 A1 | 6/2016 | Lee et al. | |
| 2016/0285319 A1* | 9/2016 | Maniktala ........... | H02J 50/12 |
| 2017/0063141 A1 | 3/2017 | Kim et al. | |
| 2017/0187245 A1 | 6/2017 | Uchida | |

(Continued)

FOREIGN PATENT DOCUMENTS

| | | |
|---|---|---|
| CN | 106461809 A | 2/2017 |
| CN | 106787265 A | 5/2017 |

(Continued)

OTHER PUBLICATIONS

Extended European Search Report dated Nov. 9, 2018 in connection with European Application No. 18180598.7.

*Primary Examiner* — Alfonso Perez Borroto
(74) *Attorney, Agent, or Firm* — Wolf, Greenfield & Sacks, P.C.

(57) ABSTRACT

A wireless power transmitter and/or receiver and methods for operating the same are provided for maintaining an uninterrupted wireless power transfer. A wireless power transmitter and/or receiver adapt at least one wireless power transfer parameter according to at least one operating condition of the wireless power transmitter.

17 Claims, 7 Drawing Sheets

(56) References Cited

U.S. PATENT DOCUMENTS

2017/0187249 A1    6/2017  Zeine et al.
2017/0237302 A1*  8/2017  Sorge .................... H02J 7/045
                                               307/104
2017/0256990 A1*  9/2017  Maniktala ............... H02J 7/025

FOREIGN PATENT DOCUMENTS

| | | |
|---|---|---|
| CN | 106797144 A | 5/2017 |
| CN | 106849385 A | 6/2017 |
| EP | 2 833 515 A1 | 2/2015 |
| JP | 2017-112834 A | 6/2017 |
| TW | 201705649 A | 2/2017 |
| TW | 201705651 A | 2/2017 |
| TW | 201709639 A | 3/2017 |

* cited by examiner

ADAPTING WIRELESS POWER TRANSFER PARAMETERS TO TRANSMITTER OPERATING CONDITIONS

CROSS REFERENCE TO RELATED APPLICATIONS

This application claims priority to and the benefit of U.S. Provisional Patent application Ser. No. 62/528,619, filed on Jul. 5, 2017 and entitled "ADAPTING WIRELESS POWER TRANSFER PARAMETERS TO TRANSMITTER AMBIENT CONDITIONS," which is hereby incorporated herein by reference in its entirety.

TECHNICAL FIELD

The present invention relates to wireless power transmission, and in particular to adapting wireless power transfer parameters to transmitter operating conditions.

BACKGROUND

Wireless power transfer systems are gaining increasing popularity as a convenient way to deliver power without wires or connectors. Wireless power transfer systems currently under development in the industry can be separated in two major classes: magnetic induction systems and magnetic resonance systems. Both types of systems include a wireless power transmitter and a wireless power receiver. Such systems can be used to power or charging mobile devices such as smartphones, tablet computers, or automotive applications, among other applications.

SUMMARY

Some embodiments relate to a wireless power transmitter configured to communicate with a wireless power receiver for transmitting electrical power thereto, the wireless power transmitter comprising: at least one sensor configured to measure at least one operating condition of the wireless power transmitter; and circuitry configured to adapt at least one wireless power transfer parameter according to the at least one operating condition of the wireless power transmitter.

The circuitry may be configured to determine whether the at least one operating condition of the wireless power transmitter exceeds a corresponding predetermined value.

The circuitry may be configured to set a first period of time with a first interval when it is determined that the at least one operating condition of the wireless power transmitter exceeds the corresponding predetermined value.

The circuitry may be configured to send a first message to the wireless power receiver, the first message indicating that the at least one operating condition of the wireless power transmitter exceeds the corresponding predetermined value.

The first message may comprise request for power contract negotiation and/or predicted maximum power capabilities.

The circuitry may be configured to adjust the at least one wireless power transfer parameter by a first amount.

The circuitry may be configured to determine whether the at least one operating condition of the wireless power transmitter still exceeds the corresponding predetermined value upon the expiration of the first period of time with the first interval.

The circuitry may be configured to: set a period of time with a second interval, and adjust the at least one wireless power transfer parameter by a second amount upon the expiration of the period of time with the second interval, when it is determined that the at least one operating condition of the wireless power transmitter is within the corresponding predetermined value upon the expiration of the first period of time with the first interval.

The second interval may be longer than the first interval.

The second amount may be less than the first amount.

The circuitry may be configured to: set a second period of time with a first interval, and send a second message to the wireless power receiver, the second message indicates that the at least one operating condition of the wireless power transmitter exceeds the corresponding predetermined value, when it is determined that the at least one operating condition of the wireless power transmitter exceeds the corresponding predetermined value upon the expiration of the first period of time with the first interval.

The at least one operating condition of the wireless power transmitter may comprise at least one of a plurality of operating conditions comprising the wireless power transmitter's internal temperature, power source's characteristics, and environmental conditions.

The at least one wireless power transfer parameter may comprise at least one of a plurality of wireless power transfer parameters comprising charging rate of the wireless power transmitter, wireless power transmission frequency, operating power level of the wireless power transmitter, and output voltage and/or current of the wireless power receiver.

Some embodiments relate to a method of controlling a wireless power transmitter configured to communicate with a wireless power receiver for transmitting electrical power thereto, the method comprising: monitoring at least one operating condition of the wireless power transmitter; and adapting at least one wireless power transfer parameter according to the at least one operating condition of the wireless power transmitter.

Some embodiments relate to a wireless power receiver configured to communicate with a wireless power transmitter for receiving electrical power therefrom, the wireless power receiver comprising: circuitry configured to adapt at least one wireless power transfer parameter according to at least one operating condition of the wireless power transmitter.

The circuitry may be configured to: receive a message from the wireless power transmitter, the message indicating that the at least one operating condition of the wireless power transmitter exceeds a corresponding predetermined value, and adjust the at least one wireless power transfer parameter in response to the message received from the wireless power transmitter.

The circuitry may be configured to request a charger to adjust the at least one wireless power transfer parameter.

The circuitry may be configured to: receive a message from the wireless power transmitter, the message indicating that the at least one operating condition of the wireless power transmitter exceeds a corresponding predetermined value, and in response to the message received from the wireless power transmitter, adjust an output voltage based on a load line.

The at least one operating condition of the wireless power transmitter may comprise at least one of a plurality of operating conditions comprising the wireless power transmitter's internal temperature, power source's characteristics, and environmental conditions.

The at least one wireless power transfer parameter may comprise at least one of a plurality of wireless power transfer parameters comprising charging rate of the wireless power receiver, wireless power transmission frequency, operating power level of the wireless power transmitter, and output voltage and/or current of the wireless power receiver.

The foregoing summary is provided by way of illustration and is not intended to be limiting.

BRIEF DESCRIPTION OF DRAWINGS

In the drawings, each identical or nearly identical component that is illustrated in various figures is represented by a like numeral. For purposes of clarity, not every component may be labeled in every drawing. The accompanying drawings are not necessarily drawn to scale, with emphasis instead being placed on illustrating various aspects of the techniques and devices described herein.

DETAILED DESCRIPTION

Aspects of the present application relate to methods and systems for maintaining an uninterrupted wireless power transfer despite variations of system operating conditions including, for example, a wireless transmitter's internal temperature, power source's characteristics, and environmental conditions. The inventors have recognized and appreciated that conventional wireless power receivers are configured to charge at the highest possible rate disregarding a complimentary wireless power transmitter's operating conditions; and conventional wireless power transmitters are configured to charge a complimentary wireless power receiver at the charging rate requested by the complimentary wireless power receiver, and to shut off abruptly upon its operating conditions exceed threshold values, resulting in poor user experience. In automotive applications, for example, ambient conditions can vary significantly, mostly resulting in elevating a wireless power transmitter's internal temperature when external heat is combined with internal increased dissipation. A conventional wireless power transmitter shuts off abruptly when the internal temperature is above a maximum value. In another example, a battery (e.g., an automobile battery) may be used to supply a conventional wireless power transmitter, which shuts off abruptly when the battery is depleted.

Figure 1A:
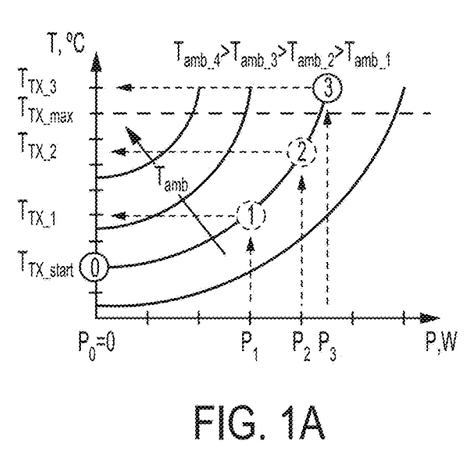
FIG. 1A shows equipower curves illustrating operating points of a conventional wireless power transfer system under an operating condition.

In one exemplary scenario, as depicted in FIG. 1A, a conventional wireless power transmitter operates at an ambient temperature of $T_{amb\_2}$. When the conventional wireless power transmitter operates at power level P1 (operating point ①), its internal temperature is $T_{Tx\_1}$. When the conventional wireless power transmitter operates at power level P2 (operating point ②) that is higher than power level P1, its internal temperature is $T_{TX\_2}$, which is higher than $T_{Tx\_1}$. When the conventional wireless power transmitter operates at power level P3 (operating point ③), its internal temperature is $T_{Tx\_3}$, which is higher than both $T_{Tx\_1}$ and $T_{TX\_2}$, and exceeds its maximum safe operating temperature $T_{Tx\_max}$. The conventional wireless power transmitter shuts off at operating point ③.

Figure 1B:
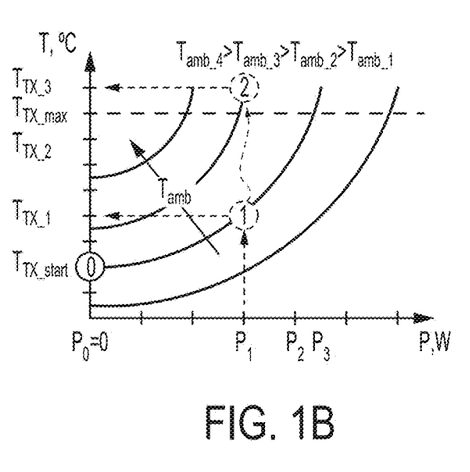
FIG. 1B shows equipower curves illustrating operating points of a conventional wireless power transfer system under different operating conditions.

In another exemplary scenario, as depicted in FIG. 1B, a conventional wireless power transmitter operates at an ambient temperature of $T_{amb\_2}$ (operating point ①), its internal operating temperature is $T_{Tx\_1}$, which is below its maximum safe operating temperate $T_{Tx\_max}$. When the ambient temperature increases to $T_{amb\_3}$ (operating point ②), the conventional wireless power transmitter's internal temperature reaches $T_{Tx\_3}$, which is higher than its maximum safe operating temperature $T_{Tx\_max}$, to operate at the same power level P1 as operating point ①. In this scenario, the conventional wireless power transmitter shuts off when the ambient temperature increase to $T_{amb\_3}$.

The inventors have recognized and appreciated that monitoring a wireless power transmitter's operating conditions and adapting wireless power transfer parameters to the wireless power transmitter's operating conditions can avoid shutting down the wireless power transmitter abruptly and thus maintain an uninterrupted wireless power transfer. The inventors have conceived and developed methods and systems for an uninterrupted wireless power transfer under unpredictable operating conditions, for example, where the ambient temperature exceeds 45° C. or varies between −20° C. and 65° C.

Figure 1C:
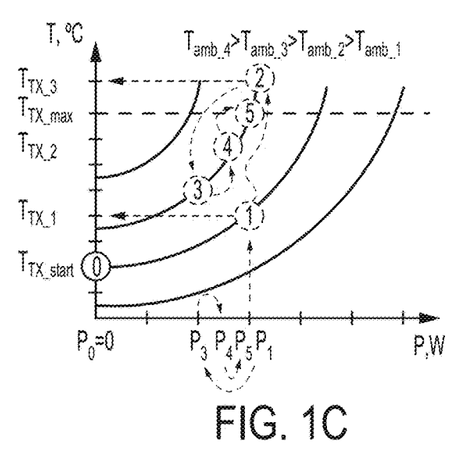
FIG. 1C shows equipower curves illustrating operating points of a wireless power transfer system, according to some embodiments.

In one exemplary scenario according to some embodiments, as depicted in FIG. 1C, a wireless power transmitter operates at an ambient temperature of $T_{amb\_2}$ (operating point (①), its internal operating temperature is $T_{TX\_1}$, which is below its maximum safe operating temperate $T_{Tx\_max}$. When the ambient temperature increases to $T_{amb\_3}$ (operating point (②)), the wireless power transmitter's internal temperature reaches $T_{Tx\_3}$, which is higher than its maximum safe operating temperature $T_{Tx\_max}$. The wireless power transmitter reduces its operating power to power level P3 (operating point (③)) such that its internal operating temperature reduces to be below its maximum safe operating temperate $T_{Tx\_max}$. Then the wireless power transmitter increases its operating power to power levels P4 (operating point (④), P5 (operating point (⑤)) until its internal operating temperature reaches or exceeds its maximum safe operating temperature $T_{Tx\_max}$. As a result, the wireless power transmitter can still transmit wireless power at an ambient temperature of $T_{amb\_3}$, instead of shutting off abruptly when the ambient temperature reaches $T_{amb\_3}$ as depicted in FIG. 1B.

In some embodiments, a wireless power transmitter may be configured to monitor its operating conditions, communicate to a wireless power receiver its predicted maximum power capabilities and/or events when its operating conditions exceed threshold values. In some embodiments, when a wireless power transmitter communicates to a wireless power receiver an event of an over-threshold operating condition, or receives a request from the wireless power receiver to reduce charging rate, a wireless power transmitter may reduce its charging rate and set a period of time with a first interval during which it may adopt the reduced charging rate. In some embodiments, the charging rate may be reduced by a first amount.

In some embodiments, when the operating condition still exceeds a corresponding threshold value upon the expiration of the period of time with the first interval, the wireless power transmitter may communicate to the wireless power receiver again with a signal indicating an event of an over-threshold operating condition. In some embodiments, the wireless power transmitter may set another period of time with a third interval during which it may continue adopting the reduced charging rate. The third interval may be the same as or different from the first interval. In other embodiments, the wireless power transmitter may further reduce its charging rate and set another period of time with a third interval during which it may adopt the further reduced charging rate. The third interval may be the same as or different from the first interval.

In some embodiments, when the operating condition becomes within its corresponding threshold value, the wireless power transmitter may continue operating on the reduced charging rate for a period of time with a second interval that may be longer than the first interval. In some embodiments, the second interval may be a multiple of the first interval, for example, 1.5, 2, 3, or any suitable number. In some embodiments, the wireless power transmitter may increase its charging rate upon the expiration of the period of time with the second interval. In some embodiments, the charging rate may be increased by a second amount, which may be a portion of the first mount, for example, between 1% and 50%, between 1% and 20%, or any suitable number.

In some embodiments, a wireless power receiver may be configured to reduce its charging rate upon receiving a message from a wireless power transmitter. The message may indicate the predicted maximum power capabilities of the wireless power transmitter and/or operating conditions of the wireless power transmitter exceed threshold values. In some embodiments, the charging rate may be reduced to a portion of an initial charging rate, for example, between 10% and 99%, between 20% and 99%, between 50% and 99%, or any suitable number.

Figure 2:
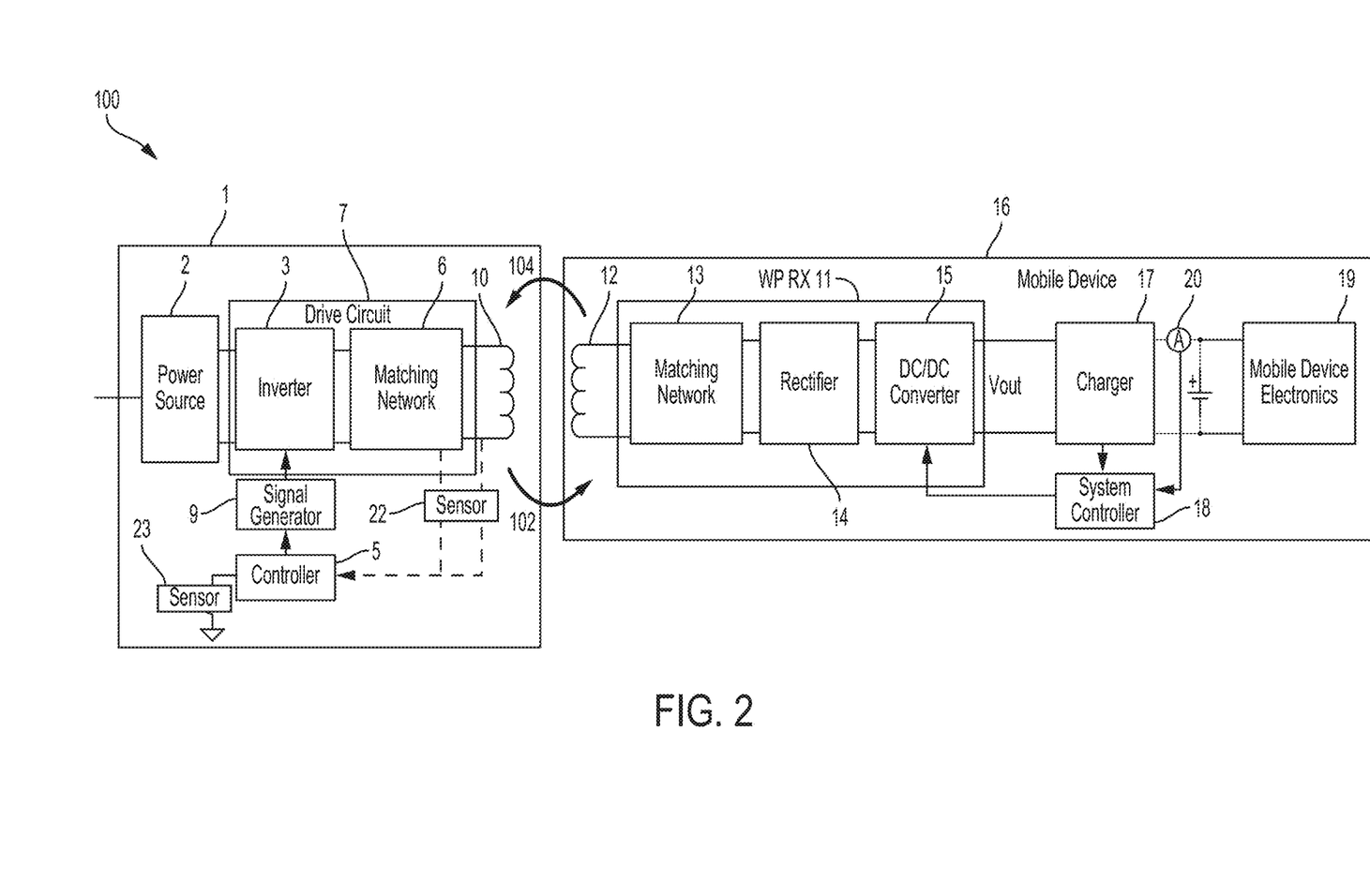
FIG. 2 shows a wireless power transfer system, according to some embodiments.

FIG. 2 depicts a high level block diagram of a wireless power transfer system 100. As shown in FIG. 2, the wireless power transfer system 100 may have a wireless power transmitter 1 and a wireless power receiver 11 embedded in a mobile device 16. It should be appreciated that the present application is not limited to embedded wireless power receivers. In some embodiments, the wireless power receiver 11 may be a component separate from the mobile device 16.

As shown in FIG. 2, the wireless power transmitter 1 may communicate to the wireless power receiver 11 via link 102. The wireless power receiver 11 may also communicate to the wireless power transmitter 1 via link 104. The links 102 and 104 may be in-band or out-of-band communication links implemented by any suitable communication circuitry. Any suitable communication protocol may be used for transmitting information via the links 102 and 104 between the transmitter 1 and receiver 11. Via the links 102 and/or 104, information may be exchanged for controlling the wireless power transfer. In some embodiments, the wireless power transmitter 1 and wireless power receiver 11 may negotiate a charging rate via the links 102 and 104.

The wireless power transmitter 1 may include a drive circuit 7 having an inverter 3 that may drive a transmit coil 10 through a matching network 6. The wireless power transmitter 1 may include a power source 2 that may provide a regulated DC voltage to the inverter 3. In some embodiments, the power source 2 may produce the regulated DC voltage in response to control stimulus from a controller 5. In some embodiments, the drive circuit 7 may be a class D or E amplifier that converts the DC voltage at the input of inverter 3 into an AC output voltage to drive the transmit coil 10. Producing an AC output voltage enables wireless power transmission through electromagnetic induction.

The wireless power transmitter 1 may include a sensor 22 that measures internal operating conditions of the transmitter 1 including, for example, internal temperatures of the matching network 6 and/or the transmit coil 10. The wireless power transmitter 1 may also include a sensor 23 that measures environmental operating conditions of the wireless power transmitter 1 including, for example, ambient temperature, humidity, and geographical information such as latitude. The wireless power transmitter 1 may communicate with the wireless power receiver 11 according to the measured operating conditions by the sensors 22 and 23 via the link 102.

The controller 5 may receive the measured operating conditions from the sensors 22 and 23, and adapt wireless charging parameters, for example, charging rate, wireless power transmission frequency, operating power level of the wireless power transmitter, strength of the transmitter electromagnetic field, output voltage and/or current of the wireless power receiver, according to the measured operating conditions. The charging rate may be modified by a wireless power transmission frequency. In some embodiments, the controller 5 may control a signal generator 9 to drive the inverter 3 with signals of a selected wireless power transmission frequency. As an example, the inverter 3 may be switched at a frequency between 100 and 205 kHz to transmit power to the wireless power receiver 11 if the wireless power receiver 11 is designed to receive wireless power according to the Qi specification for low power Qi receivers, and between 80 and 300 kHz for medium power Qi receivers. The inverter 3 may be switched at a higher frequency, such as a frequency of greater than 1 MHz, within an ISM band, e.g., 6.675 MHz to 6.795 MHz, to transmit power to a receiver designed to receive wireless power using magnetic resonance technology. However, these frequencies are described merely by way of example, as wireless power may be transmitted at a variety of suitable frequencies, in accordance with any suitable specifications.

The controller 5 may be an analog circuit or a digital circuit. The controller 5 may be programmable, and may command the signal generator 9 to produce signals at a desired transmission frequency based on stored program instructions, so that the inverter 3 switches at the desired transmission frequency. The matching network 6 may facilitate wireless power delivery by presenting a suitable impedance to the inverter 3. The matching network 6 may have one or more capacitive or inductive elements or any suitable combination of capacitive and inductive elements. Since the transmit coil 10 may have an inductive impedance, in some embodiments, the matching network 6 may include one or more capacitive elements, which, when combined with the inductive impedance of the transmit coil 10, presents an impedance to the output of inverter 3 suitable for driving the transmit coil 10. In some embodiments, during wireless power transfer, the resonant frequency of the matching network 6 may be set equal to or approximately equal to the switching frequency of the inverter 3. The transmitter coil 10 may be realized by any suitable type of conductors. The conductors may be wires, including solid wire or Litz wire, or patterned conductors, such as patterned conductors of a PC board or an integrated circuit.

The AC current in the transmit coil 10 may generate an oscillating magnetic field in accordance with Ampere's law. The oscillating magnetic field may induce an AC voltage into a receiver coil 12 of the wireless power receiver 11 in accordance with Faraday's law. The AC voltage induced in the receiver coil 12 may be provided through a matching network 13 to a rectifier 14 that may generate an unregulated DC voltage. The rectifier 14 may be a synchronous rectifier or may be implemented using diodes. The unregulated DC voltage may be regulated using a DC/DC converter 15, the output of which may be filtered and provided as output voltage Vout to mobile device electronics 19 through a charger 17 that may measure the Vout. A system controller 18 may receive the measured Vout from the charger 17 and an output current Io measured by an ammeter 20, and control the DC/DC converter 15 according to the measured Vout and Io. In some embodiments, the DC/DC converter 15 may be replaced by a linear regulator or battery charger, or eliminated altogether. The system controller 18 may control the rectifier 14 according to the measured Vout and Io. The wireless power receiver 11 may communicate with the wireless power transmitter according to the measured Vout and Io via the link 104. In some embodiments, the wireless power receiver 11 may request the charger to adjust its charging rate upon receiving a message from the wireless power transmitter that indicates an operating condition of the wireless power transmitter exceeds a corresponding predetermined value.

Figure 3:
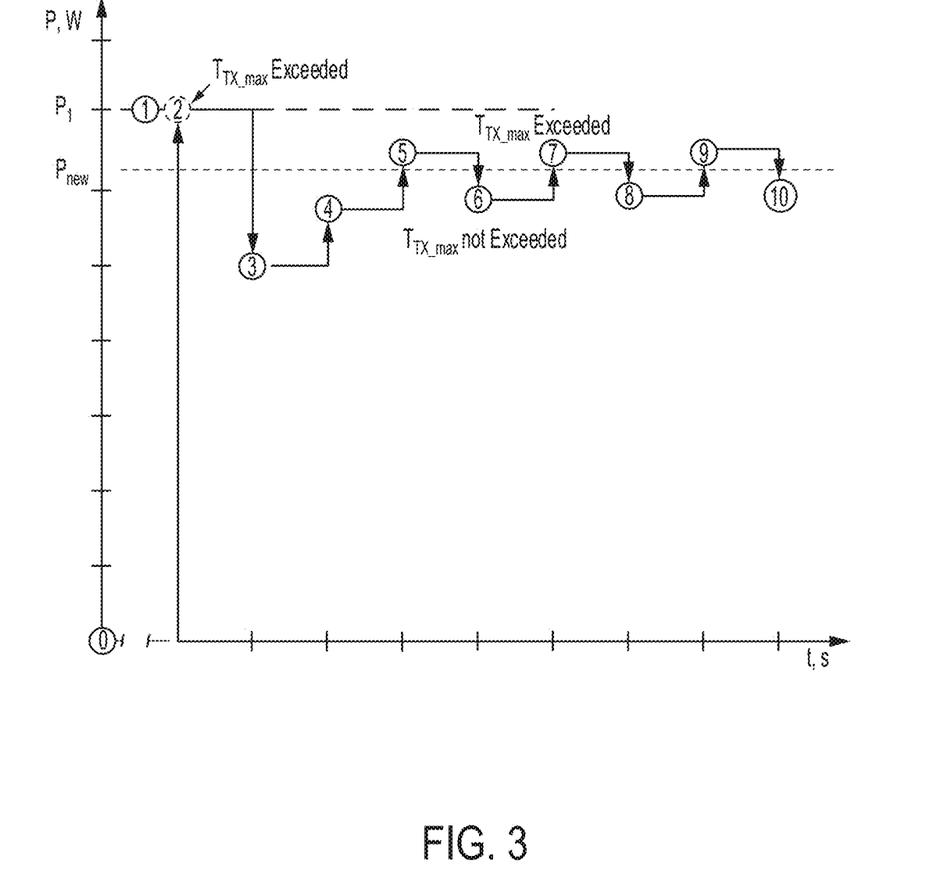
FIG. 3 shows a time diagram illustrating operating points of a wireless power transfer system, according to some embodiments.

FIG. 3 depicts a time diagram illustrating operating points ①-⑩ of a wireless power transfer system, according to some embodiments. FIG. 3 shows how a wireless charging system comes into dynamic balance by converging at a new power level $P_{new}$ when an operating condition of a wireless power transmitter of the wireless power transfer system changes. For example, as the exemplary scenario depicted in FIG. 1C, when the ambient temperature increases from $T_{amb\_2}$ to $T_{amb\_3}$, the wireless power transmitter may converge at a new power level P5 instead of power level P1 when the ambient temperature is $T_{amb\_2}$. In some embodiments, the new power level $P_{new}$ may dynamically change when a wireless power transmitter operates in a different operating condition, for example, a different ambient temperature, a different power level requested by a wireless power receiver, and/or a different cooling rate for the wireless power transmitter.

Figure 4:
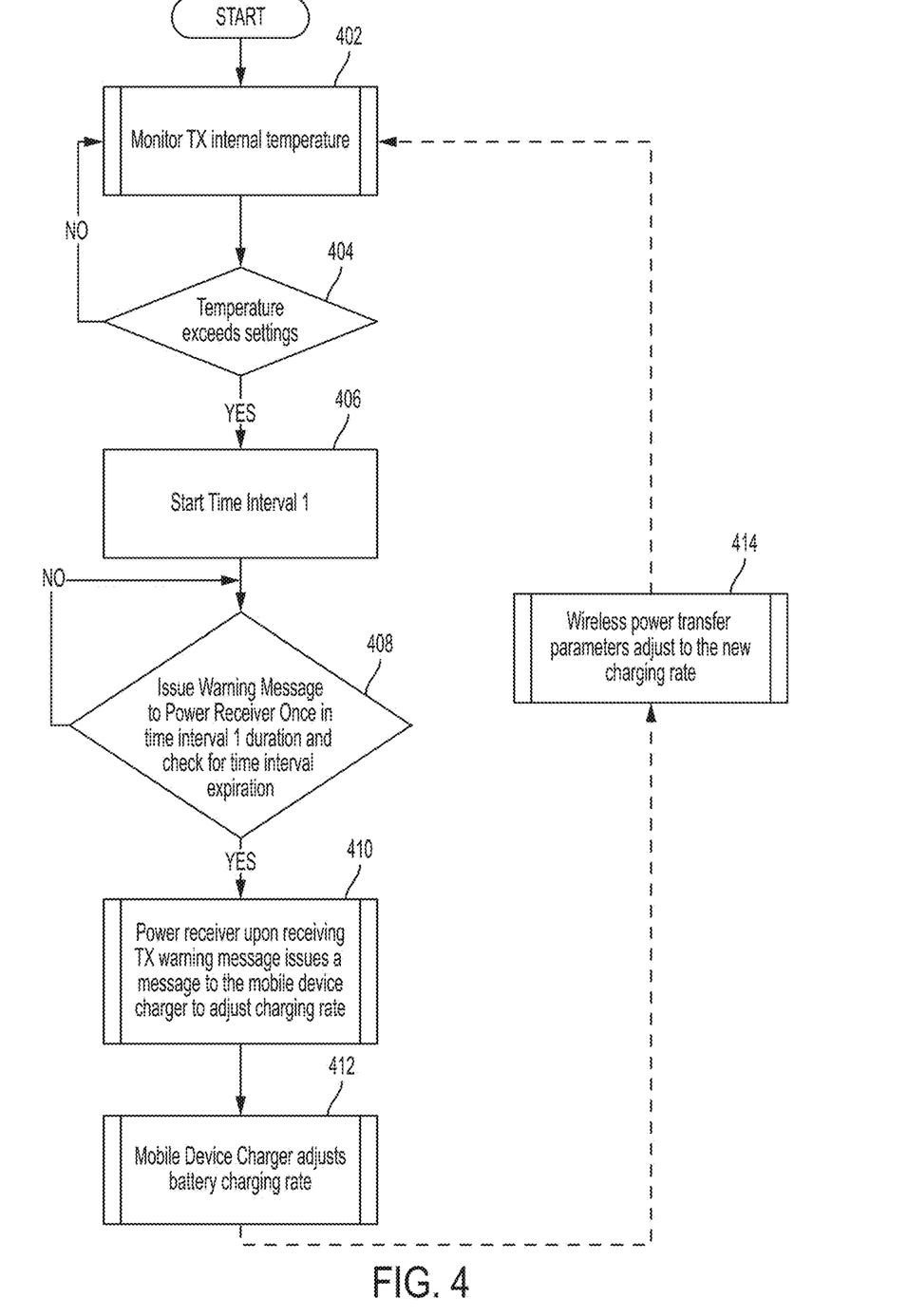
FIG. 4 shows a flow chart illustrating a method of controlling a wireless power transfer system, according to some embodiments.

FIG. 4 depicts a flow chart of acts associated with a method 400 for controlling a wireless power transfer system, for example, the wireless power transfer system 100 depicted in FIG. 2, according to some embodiments. The method 400 may comprise iterative measuring operating conditions of a wireless power transmitter (e.g., wireless power transmitter 1), and adapting wireless power transfer parameters of the wireless power transfer system according to the measured operating conditions of the wireless power transmitter.

For example, the method 400 may comprise monitoring (step 402) a wireless power transmitter's internal temperature, and determining (step 404) whether the wireless power transmitter's internal temperature exceeds a predetermined value. In some embodiments, the predetermined value may be a maximum operating temperature, which may be set on design stage based on, for example, component safe operating ranges, available means for heat removal, and effectiveness of operation.

The method 400 may further comprise setting (step 406) a first period of time with a first interval when it is determined that the wireless power transmitter's internal temperature exceeds the predetermined value, and sending (step 408) a first message from the wireless power transmitter to a wireless power receiver (e.g., wireless power receiver 11). The first message may indicate that the wireless power transmitter's internal temperature exceeds the predetermined value. In some embodiments, the first interval may be set such that the number of communication events from the wireless power transmitter to the wireless power receiver are reduced because the communication speed between them may be very limited. For example, the first interval may be thirty seconds, one minute, or any suitable time. The wireless power transmitter and/or receiver may check the expiration of the first interval such that the number of messages sent before the expiration of the first interval can be limited. For example, the number of messages sent before the expiration of the first interval may be limited to one message.

The method 400 may further comprise sending (step 410) a message from the wireless power receiver to a charger (e.g., charger 17) when the wireless power receiver receives the first message from the wireless power transmitter, and adjusting (step 412) charging rate of the wireless power transfer system (e.g., battery charging rate of the mobile device electronics 19) by the charger. The wireless power receiver may send the message to the charger during and/or at the end of the first interval.

The method 400 may further comprise adjusting (step 414) power transfer parameters of the wireless power transfer system according to the adjusted charging rate. The power transfer parameters of the wireless power transfer system may include operating power level of the wireless power transmitter, output voltage and/or current of the wireless power receiver, and any suitable parameters that affect charging rate of the wireless power transfer system.

Figure 5:
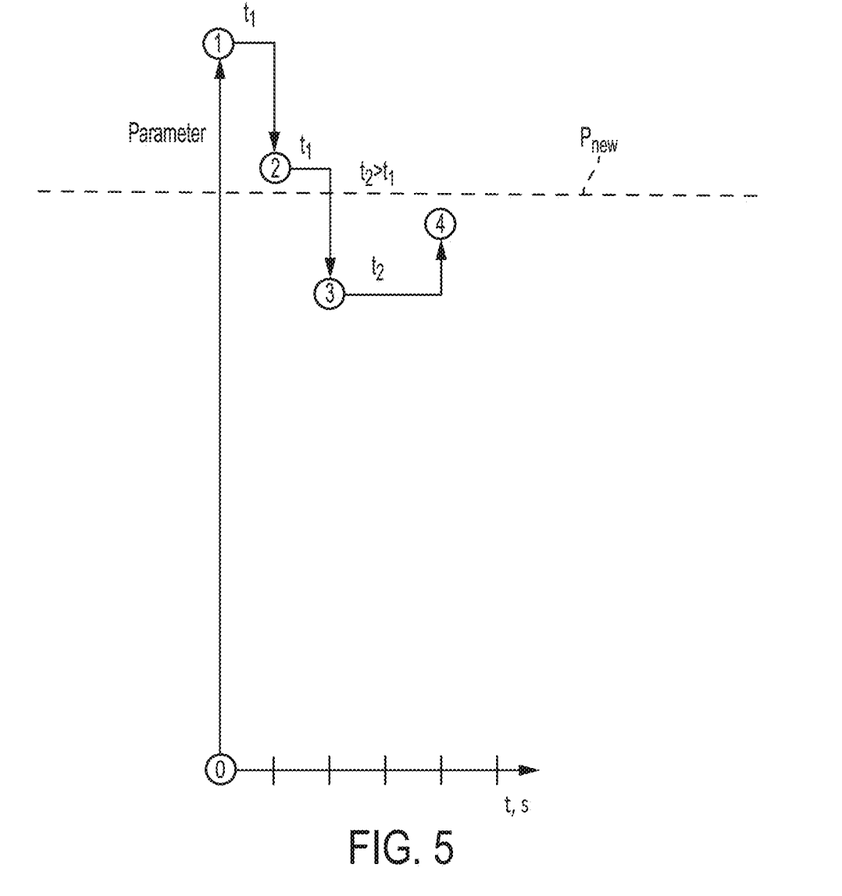
FIG. 5 shows a time diagram of operating points of a wireless power transfer system with the method of FIG. 4, according to some embodiments.

FIG. 5 depicts a time diagram of operating points ①-④ of a wireless power transfer system with the method 400, according to some embodiments. FIG. 5 shows that, when an operating condition of a wireless power transmitter exceeds a predetermined value, a wireless power transfer parameter of the wireless power transfer system may vary over time around a new value (e.g., $P_{new}$) to keep the operating condition of a wireless power transmitter below the predetermined value.

In some embodiments, at operating point ①, at one operating condition of a wireless power transmitter may exceed a corresponding predetermined value. The wireless power transmitter and/or a wireless power receiver may set a first period of time with a first interval and adjust (e.g., reduce) at least one wireless power transfer parameter by a first amount. At operating point ②, it may be determined that the at least one operating condition of the wireless power transmitter still exceed the corresponding predetermined value. The wireless power transmitter and/or a wireless power receiver may set a second period of time with the first interval, during which the wireless power and/or a wireless power receiver may further adjust (e.g., reduce) the at least one wireless power transfer parameter by another first amount. At operating point ③, it may be determined that the at least one operating condition of the wireless power transmitter falls below the corresponding predetermined value. The wireless power transmitter and/or a wireless power receiver may set a period of time with a second interval. The wireless power transmitter and/or a wireless power receiver may adjust (e.g., increase) the at least one wireless power transfer parameter by a second amount upon the expiration of the period of time with the second interval. In some embodiments, the second interval may be longer than the first interval. In some embodiments, the second amount is less than the first amount. At operating point ④, the at least one operating condition of the wireless power transmitter may be closer to the corresponding predetermined value because the wireless power transmitter and/or a wireless power receiver may adjust (e.g., increase) the at least one wireless power transfer parameter by a second amount at operating point ③.

For example, the wireless power transfer parameter may be a wireless power receiver's charging current. When a wireless power receiver in the system receives a message that indicates a wireless power transmitter's internal temperature exceeds its maximum operating temperature, the wireless power receiver may change its charging current by an amount, which may be predetermined. In some embodiments, a wireless power transfer system may include a plurality of wireless power receivers. When the wireless power receivers receive messages that indicate a wireless power transmitter's internal temperature exceeds its maximum operating temperature, the wireless power receivers may change their charging currents by different amounts or a same amount.

Figure 6:
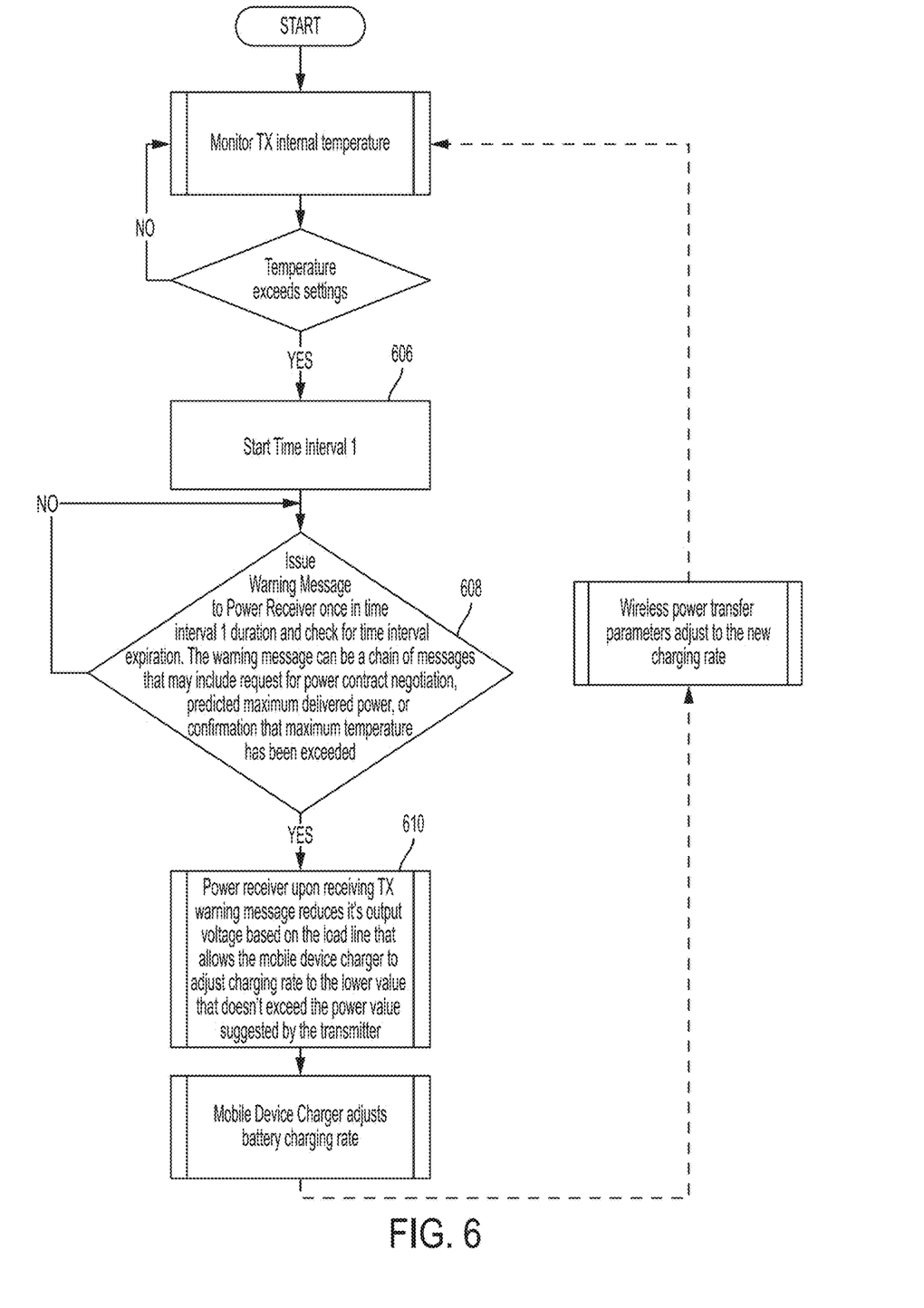
FIG. 6 shows a flow chart illustrating a method of controlling a wireless power transfer system by utilizing dynamic power limiting feature of an electronic device, according to some embodiments.

FIG. 6 depicts a flow chart of acts associated with a method 600 for controlling a wireless power transfer system, for example, the wireless power transfer system 100 depicted in FIG. 2, according to some embodiments. The method 600 may control a wireless power transfer system by utilizing dynamic power limiting feature of an electronic device. In some embodiments, a wireless power transfer system may operate on a plurality of load lines. The wireless power transfer system may change its operation point from a first load line to a second load line in order to comply with a wireless power transmitter's maximum internal temperature.

The method 600 may comprise setting (step 606) a first period of time with a first interval when it is determined that a wireless power transmitter's internal temperature exceeds the predetermined value, and sending (step 608) a first message from the wireless power transmitter to a wireless power receiver (e.g., wireless power receiver 11). The first message may indicate that the wireless power transmitter's internal temperature exceeds the predetermined value. In some embodiments, the first message may comprise a chain of messages, which may include a message requesting for power contact negation, and/or a message indicating its predicted maximum power capabilities.

The method 600 may further comprise reducing (step 610) the wireless power receiver's output voltage based on load lines that allow a charger (e.g., charger 17) to adjust charging rate of the wireless power transfer system (e.g., battery charging rate of the mobile device electronics 19), when the wireless power receiver receives the first message from the wireless power transmitter.

Figure 7A:
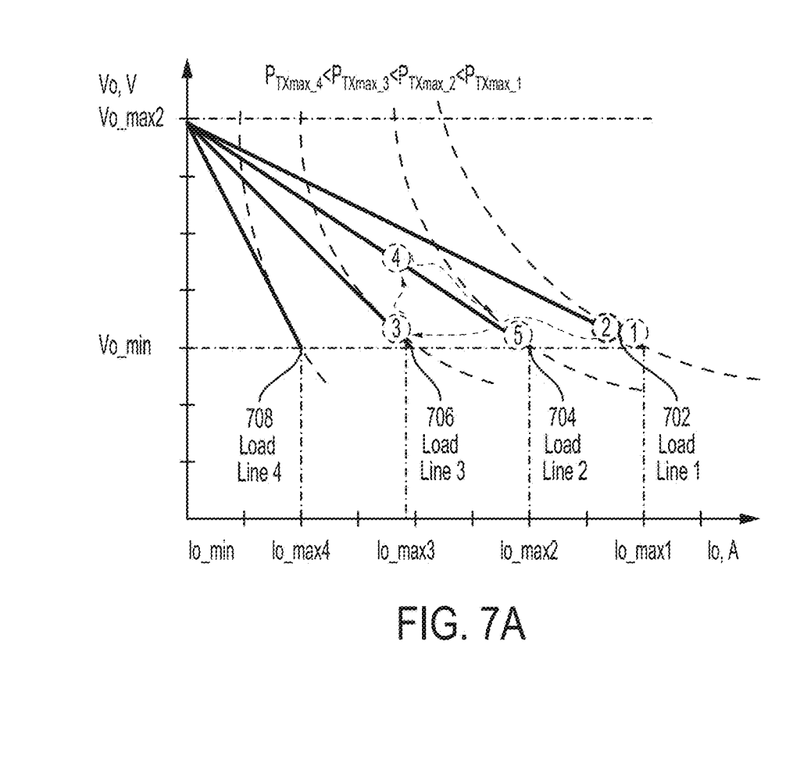
FIG. 7A shows operating points on load lines of a wireless power transfer system controlled by the method of FIG. 6, according to some embodiments.
Figure 7B:
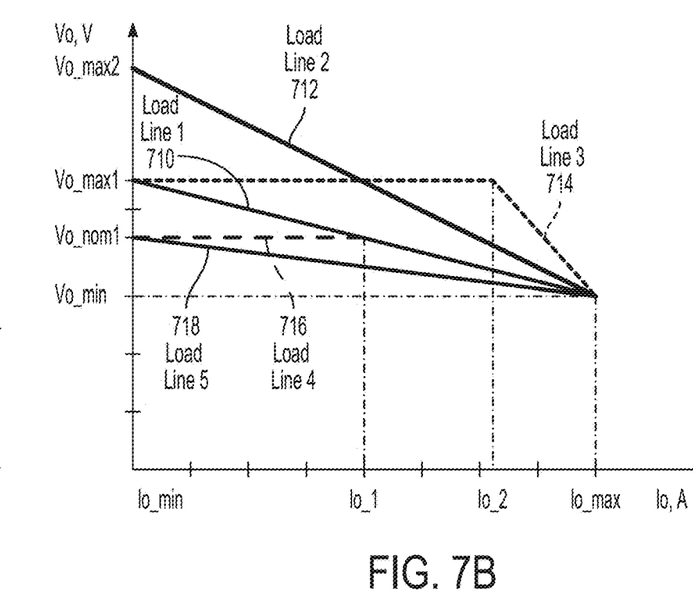
FIG. 7B shows exemplary load lines that may be used along the method of FIG. 6, according to some embodiments.

FIG. 7A depicts operating points ①-⑤ on load lines 702-708 of a wireless power transfer system controlled by the method 600, according to some embodiments. FIG. 7B further depicts exemplary load lines, including linear load lines 710, 712, 718 and non-linear load lines 714, 716, that may be used along the method 600, according to some embodiments. As illustrated in FIGS. 7A-7B, load lines may show a relationship between an output voltage $V_o$ and an output current $I_o$ for a wireless power receiver, DC-DC converter, or charger. The output voltage may decrease, increase, or stay constant as the output current increases.

The load lines may be associated with effective output impedance of a circuit, e.g., a wireless power receiver, DC-DC converter, or charger. The load lines may be chosen such that the output voltage may swing in the range between a minimum output voltage, e.g., $V_{o\_min}$, and a maximum output voltage, e.g., $V_{o\_max1}$, $V_{o\_max2}$, without exceeding a maximum power level. Individual load lines may have corresponding maximum power levels. For example, in FIG. 7A, maximum power levels $P_{TXmax\_1}$-$P_{TXmax\_4}$ corresponds to load lines 702-708, respectively. The load lines may also be chosen such that the circuit operates on a maximum available output current, e.g. $I_{o\_max1}$-$I_{o\_max4}$.

In some embodiments, a wireless power receiver may reduce its output voltage based on load lines when the wireless power receiver receives from a wireless power transmitter a message that indicates the wireless power transmitter's internal temperature exceeds a predetermined value. In the example illustrated in FIG. 7A, at operating point ①, a wireless power transmitter may operate at $P_{TXmax\_1}$. At operating point ②, the wireless power transmitter's internal temperature may exceed the predetermined value. Then the wireless power transmitter may send a warning message to a wireless power receiver. In response to the warning message, the wireless power receiver may move to operating point ③ on load line 706, which achieves the minimum output voltage $V_{o\_min}$ at a lower output current $I_{o\_max3}$ and lower power level $P_{TXmax\_3}$. According to the method 600, the wireless power transfer system may change its operating points from ③ on load line 706 to ④, ⑤ on load line 704 in response to the messages sent between the wireless power transmitter and receiver. In some embodiments, the changes of operating points may be facilitated in the receiver, in the transmitter, or partially in the transmitter and partially in the receiver.

Although the illustrated methods 400 and 600 use a wireless power transmitter's internal temperature as an example of a wireless power transmitter's operating conditions, a person of ordinary skill in the art would appreciated that the present application is not limited in this regard. A wireless power transmitter's operating conditions may include power source's characteristics, environmental conditions, and any suitable operating conditions.

The wireless power transmitter 1 and wireless power receiver 11 may include a controller, such as controller 5 and/or controller 18, for performing the acts described above (e.g., methods of FIGS. 4 and 6). Such a controller may be implemented by any suitable type of circuitry. For example, the controller may be implemented using hardware or a combination of hardware and software. When implemented using software, suitable software code can be executed on any suitable processor (e.g., a microprocessor) or collection of processor. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments described herein comprises at least one computer-readable storage medium (e.g., RAM, ROM, EEPROM, flash memory or other memory technology, or other tangible, non-transitory computer-readable storage medium) encoded with a computer program (i.e., a plurality of executable instructions) that, when executed on one or more processors, performs the above-discussed functions of one or more embodiments. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

Various aspects of the apparatus and techniques described herein may be used alone, in combination, or in a variety of arrangements not specially discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

The terms "approximately", "substantially," and "about" may be used to mean within ±20% of a target value in some embodiments, within ±10% of a target value in some embodiments, within ±5% of a target value in some embodiments, and yet within ±2% of a target value in some embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A wireless power transmitter, comprising:
    at least one sensor configured to measure at least one operating condition of the wireless power transmitter; and
    circuitry configured to:
        transmit power wirelessly to a wireless power receiver;
        determine the at least one operating condition is outside a predetermined range;
        transmit a message to the wireless power receiver indicating the at least one operating condition is outside the predetermined range; and
        after transmitting the message, reduce at least one wireless power transfer parameter to a non-zero value in response to the wireless power receiver setting an operating point corresponding to a reduced power level.

2. The wireless power transmitter of claim 1, wherein the circuitry is configured to set a first period of time with a first interval when it is determined that the at least one operating condition of the wireless power transmitter is outside the predetermined range.

3. The wireless power transmitter of claim 1, wherein the message comprises a request for power contract negotiation and/or predicted maximum power capabilities.

4. The wireless power transmitter of claim 2, wherein the circuitry is configured to adjust the at least one wireless power transfer parameter by a first amount in response to the wireless power receiver setting the operating point corresponding to a reduced power level.

5. The wireless power transmitter of claim 4, wherein the circuitry is configured to determine whether the at least one operating condition of the wireless power transmitter is outside the predetermined range upon the expiration of the first period of time with the first interval.

6. The wireless power transmitter of claim 5, wherein the circuitry is configured to:
    set a period of time with a second interval, and
    when it is determined that the at least one operating condition is outside a predetermined range upon expiration of the period of time with the second interval, adjust the at least one wireless power transfer parameter by a second amount upon the expiration of the period of time with the second interval.

7. The wireless power transmitter of claim 6, wherein the second interval is longer than the first interval.

8. The wireless power transmitter of claim 6, wherein the second amount is less than the first amount.

9. The wireless power transmitter of claim 5, wherein the circuitry is configured to:
    set a second period of time with a second interval, and
    when it is determined that the at least one operating condition is outside a predetermined range upon expiration of the period of time with the second interval, send a second message to the wireless power receiver, the second message indicating that the at least one operating condition of the wireless power transmitter is outside the predetermined range.

10. The wireless power transmitter of claim 1, wherein the at least one operating condition of the wireless power transmitter comprises at least one of a plurality of operating conditions comprising the wireless power transmitter's internal temperature, power source's characteristics, and environmental conditions.

11. The wireless power transmitter of claim 1, wherein the at least one wireless power transfer parameter comprises at least one of a plurality of wireless power transfer parameters comprising charging rate of the wireless power transmitter, wireless power transmission frequency, operating power level of the wireless power transmitter, and output voltage and/or current of the wireless power receiver.

12. A method of operating a wireless power transmitter, the method comprising, by the wireless power transmitter:
    transmitting power wirelessly to a wireless power receiver;
    monitoring at least one operating condition of the wireless power transmitter;
    determining the at least one operating condition is outside a predetermined range;
    transmitting a message to the wireless power receiver indicating the at least one operating condition is outside the predetermined range; and
    after transmitting the message, reducing at least one wireless power transfer parameter to a non-zero value in response to the wireless power receiver setting an operating point corresponding to a reduced power level.

13. A wireless power receiver, comprising:
    circuitry configured to:
        receive power wirelessly from a wireless power transmitter;

receive a message from the wireless power transmitter indicating at least one operating condition of the wireless power transmitter is outside a predetermined range;

set an operating point corresponding to a reduced level in response to receiving the message; and receive power wirelessly from the wireless power transmitter in response to the wireless power transmitter reducing at least one wireless power transfer parameter to a reduced, non-zero value based on the operating point.

14. The wireless power receiver of claim 13, wherein the circuitry is configured to request a charger to adjust the at least one wireless power transfer parameter.

15. The wireless power receiver of claim 13, wherein the circuitry is configured to:

set the operating point by adjusting an output voltage based on a load line.

16. The wireless power receiver of claim 13, wherein the at least one operating condition of the wireless power transmitter comprises at least one of a plurality of operating conditions comprising the wireless power transmitter's internal temperature, power source's characteristics, and environmental conditions.

17. The wireless power receiver of claim 13, wherein the at least one wireless power transfer parameter comprises at least one of a plurality of wireless power transfer parameters comprising charging rate of the wireless power receiver, wireless power transmission frequency, operating power level of the wireless power transmitter, and output voltage and/or current of the wireless power receiver.

* * * * *